Figure 1:
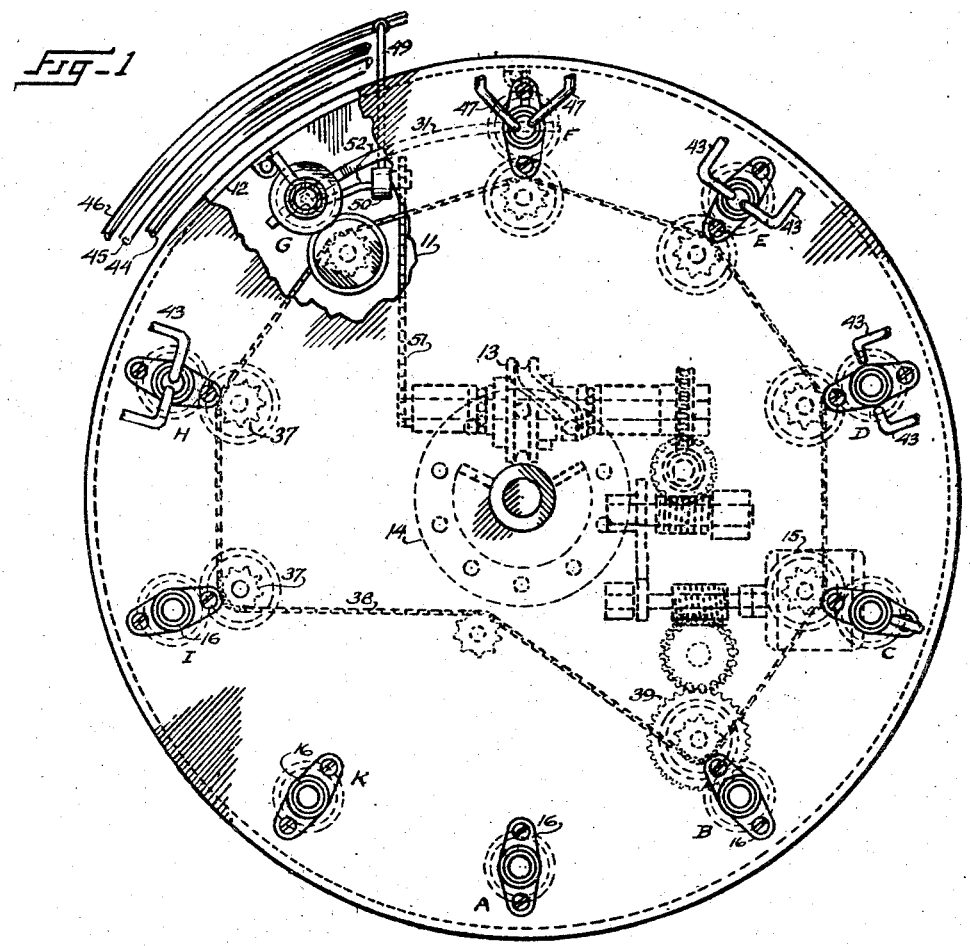

Oct. 15, 1946.  C. EISLER  2,409,423
DRIVING MEANS FOR GLASS FORMING MACHINES
Original Filed Jan. 20, 1944  2 Sheets-Sheet 1

INVENTOR
CHARLES EISLER
BY
ATTORNEY

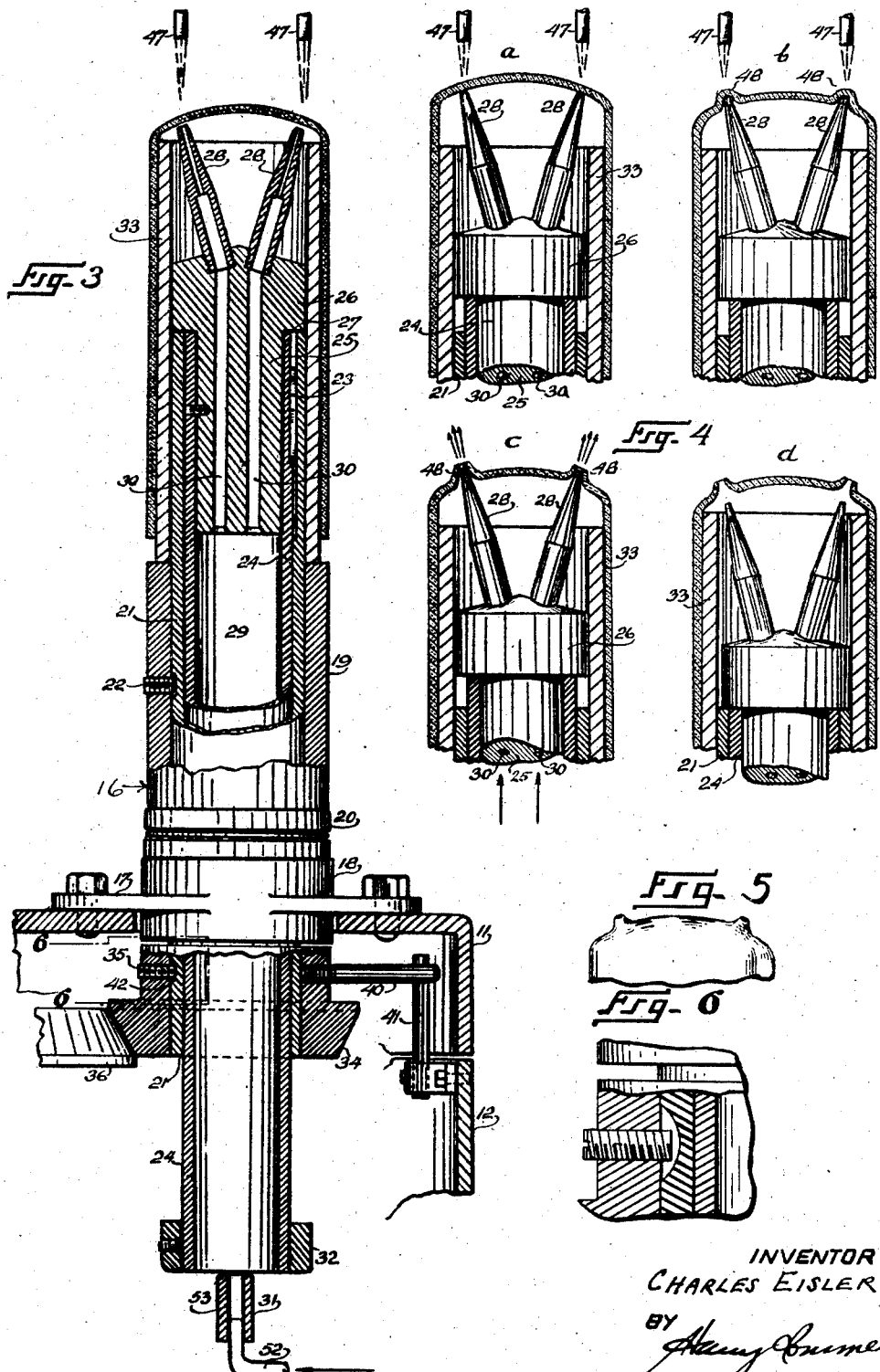

Patented Oct. 15, 1946

2,409,423

UNITED STATES PATENT OFFICE 2,409,423

DRIVING MEANS FOR GLASS FORMING MACHINES

Charles Eisler, South Orange, N. J.

Original application January 20, 1944, Serial No. 519,061. Divided and this application March 7, 1945, Serial No. 581,385

3 Claims. (Cl. 192—4)

1

This application is filed as a divisional application in compliance with the requirement for division in my co-pending application, Serial No. 519,061, filed January 20, 1944. The benefit of the filing date of the last mentioned application is claimed for this application.

In glass forming machinery it has heretofore been customary to provide positive driven members for rotating the glass treating heads at the various stations of the machine. In some instances expensive slippage means have been provided in the driving mechanism to conform to the requirements of the machine to stop rotation of the heads at various stations. Such slippage means have been generally of complicated and expensive structure.

The object of this invention is to provide a driving means for the heads of glass working machines, said driving means incorporating novel means for preventing the rotation of the heads at predetermined stations.

Figure 2:
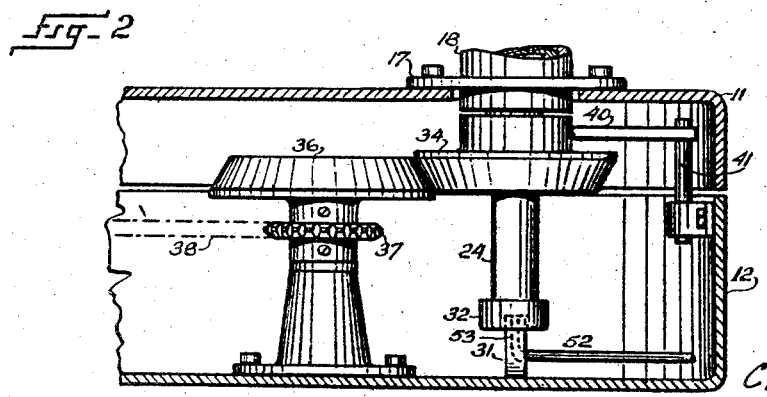

These and other advantageous objects, which will later appear, are accomplished by the simple and practical construction and combination of parts hereinafter described and more particularly shown in the drawings, illustrating embodiments of my invention, and in which:

Fig. 1 is a top plan view of a machine wherein the driving means of my invention is incorporated, the spider of the machine being shown cut away to better reveal other parts of the machine, Fig. 2 is a vertical, fragmentary, sectional view thereof, showing the driving means for rotating and stopping the heads of said machine, Fig. 3 is a vertical elevational view, partly sectional, of one of the heads of the machine and associated parts, including the driving means for said head, Fig. 4 is a fragmentary vertical, sectional view showing in the sub-views a, b, c and d, operations performed on a glass unit in the operation of the machine of Fig. 1, Fig. 5 is a fragmentary elevational view of the upper portion of a glass bulb completed in accordance with the operations illustrated in Fig. 4 and Fig. 6 is an enlarged view taken on line 6—6 of Fig. 3.

In the drawings, the driving means embodying my invention is shown in Figs. 2 and 3. Said means may be used in connection with heads of glass working machines wherein the glass object treated by the machine is formed, annealed, washed, sealed or subjected to any other operation such as, for example, to the operation of forming protuberances in a glass blank and piercing the same. For the sake of illustrating one application of the driving means of my invention to a glass working machine, the drawings illustrate, particularly in Figs. 1, 3 and 4, application of the invention to heads for forming protuberances in glass blanks and piercing the same. Such illustration is solely for the purpose of exemplifying one embodiment of the invention and is in no sense restrictive of the application and scope of the invention to other glass working machines wherein the driving means of my invention may be applied in connection with heads used for other purposes.

As shown in Figs. 2 and 3 of the drawings, the driving means of my invention comprises a driven cone 34 which is preferably circumferentially tapered for complementary circumferential frictional engagement with the driving cone 36, the latter being driven by any suitable power source such as the sprocket gear 37, chain 38, driving sprocket 39 and transmission and speed mechanism of any desired type associated with the motor 15.

The cone 34 is keyed to the lower end of the head 16 (or it is, as shown in the drawings, keyed to the extension sleeve 21 thereof) by any suitable or desired means which will permit of the axial reciprocation of said cone on said head as hereinafter more fully described.

The machine may be of any type; to illustrate the invention, there is shown a machine comprising a spider 11 rotatably mounted on the base 12, intermittent rotation of the spider being effected by an indexing device exemplified by the barrel cam 13 periodically engaging the indexing disc 14 secured to the spider, the barrel cam being driven by the motor 15 and the usual transmission and speed reducing means well known to those skilled in the art.

The piercing heads are shown at 16 (ten being shown) and are mounted on the spider 11 by the flange 17 integral with the vertical guide-portions 18. Each head comprises an outer sleeve 19 rotating on the ball-bearings 20 or other suitable bearing for easy rotation of the head. The outer sleeve 19 has an inner extension sleeve 21, both sleeves being held in fixed relation by the screws 22.

Axially or longitudinally slidable and rotatable with the extension sleeve 21 is the lifting sleeve 24 which is operatively connected to the sleeve 21 by the limiting key 23. In the top of the lifting sleeve 24 is the fixed nozzle carrier 25 having the head 26 which normally, that is, when the piercing head is inactive, has seat 27 on the extension sleeve 21. The blow nozzles 28 are screwed or otherwise secured into the nozzle carrier 25 and communicate with the interior 29 of the tubular lifting sleeve 24 by air ducts 30. The lifting sleeve, with the nozzle carrier and nozzles, is raised by the cam track 31 engaging the collar 32 of the sleeve 24. The piercing head is also provided with the heat insulating sleeve 33 resting on top of the outer sleeve 19, over which is slipped the electronic tube which is to be pierced, the tube fitting loosely enough to descend by its own weight.

The tube goes through the usual preheating treatment during which operations it is rotated while the spider halts at the heating stations, these operations being well understood by those skilled in this art.

For rotating the piercing heads the friction cone 34 is mounted on the extension sleeve 21 by the screws 35, the cone being frictionally entrained and rotated by the driving cone 36 as above stated.

The driven cone 34 is provided with projecting means as a finger 40 designed to engage stop pins 41 or the like fixed in the base 12, which pins are stationed at points where the rotation of the piercing heads is to be halted. The mechanism for rotating the piercing heads differs from that previously employed in seating machines and the like; two friction cones are employed in place of the usual positive driver or roller and gear drive with the usual slippage hub in the driving gear; these more expensive slippage means have been dispensed with. During the rotational stop of the piercing head the driving cone will overcome the frictional resistance of the driven cone which is stopped by the engagement of the finger 40 with a stop pin 41.

In carrying out my invention, I provide means for enabling the cones 34 and 36 to have relative axial reciprocation during the engagement of the finger 40 with stop pin 41. As an example of such means, I have shown the cone 34 as allowed to slide to a limited extent on the sleeve 21 by the set-screw 35 which engages the axially slotted recess 42 of the sleeve 21. By this means the cone 34 will, by its own weight, normally bear down on the driving cone to drive cone 34 for rotation of the head; at the predetermined stations wherein the stop pins 41 are fixed to base 12, the cone 34 will, responsive to the rotation of cone 36 and the complementarily tapered circumferences of the cones, yield slightly upward and remain stationary (the sleeve 21 and head likewise remaining stationary while cone 34 so engages stop 41).

The process of piercing the glass tube is as follows: The glass tube is placed over the heat insulating sleeve 33 at the loading station A, sliding into place by its own weight. It is then supported by the sleeve 33 as shown in Fig. 3, with the nozzles clearing the inside of the top of the tube. The head, after passing stations B, C, D and E, for preheating and heating by the burners 43 fed from the usual gas, oxygen and air supply pipes 44, 45 and 46, then reaches station F where the rotation of the piercing head is stopped by the engagement of the finger 40 with the stop 41 so that the nozzles 28 are directly under the overhead flames 47 by which the spot heating of the glass tube head is effected. At the same time the nozzles 28 are raised by the cam track 31 and they lift the glass tube as shown in Fig. 4a. The localized plasticity of the glass tube then allows it to settle down on the nozzles by its own weight and the buttons or protuberances 48 are formed as shown in Fig. 4b. The nozzles therefore serve initially as forming tools. At the next station G compressed air is admitted into the sleeve 24 through the duct 49 to economizer 50 or other control device, which is worked by the transmission 51 cooperative with the indexing drive, and thence through the duct 52 to the outlet 53 in the cam track and from there into the sleeve. The compressed air then passes through the ducts 30 to the nozzles as in Fig. 4c and the blast pierces the glass protuberances 48. Immediately thereafter the spider moves to carry the mechanism to a sharp drop in the cam track which causes the nozzles to descend and the now perforated glass tube resumes the original position shown in Fig. 3 and Fig. 4d. The pierced tube is shown in Fig. 5 and is then annealed at stations H and I by further application of heat.

Having thus described my invention what I claim as new and desire to secure by Letters Patent, is:

1. Driving means for glass working machines having a head for receiving glass objects said head being rotatably journalled in said machine and being provided with a vertical slotted recess, said driving means comprising a driven friction cone, a key member on said cone projecting into said recess to key said cone to said head for limited axial reciprocation thereon, said cone being circumferentially tapered, a driving cone complementarily tapered circumferentially, means to position said driving cone for engagement with said driven cone, means projecting from said driven cone, and a stop member in the machine to be engaged by said projecting means to stop rotation of the driven cone.

2. In a glass forming machine, a bearing member, a tubular head member positioned in and rotatably journalled on said bearing member, said head member being provided with a vertical slit, a cone member provided with a key freely received in said slit to key said cone to said head and permit of the limited axial reciprocation of the cone relative to the head, a second cone on which the first mentioned cone normally rests, a member fixed to and projecting from the first named cone, and stop means in said machine adapted to be engaged by said projecting member to stop rotation of the first named cone while permitting continued rotation of the second named cone, the first named cone moving away from the second named cone in said limited axial reciprocation, while the first named cone engages said stop means.

3. In a glass forming machine, a bearing member, a tubular head member positioned in and rotatably journalled on said bearing member, said head member being provided with a vertical slit, a cone member provided with a key freely received in said slit to key said cone to said head and permit of the limited axial reciprocation of the cone relative to the head, a second cone on which the first mentioned cone normally rests, a member fixed to and projecting from the first named cone in the plane thereof and a stop pin in said machine disposed at an axial plane at right angles to that at which the member projects from the first mentioned cone, and adapted to be engaged by said projecting member to stop rotation of the first named cone while permitting continued rotation of the second named cone, the projecting member moving along the pin in the axial plane of the latter, and the first named cone moving away from the second named cone in said limited axial reciprocation while the first named cone engages said stop means.

CHARLES EISLER.